US008682611B2

(12) United States Patent
Nakadai

(10) Patent No.: US 8,682,611 B2
(45) Date of Patent: Mar. 25, 2014

(54) DISTANCE METRIC ESTIMATING SYSTEM, COORDINATE CALCULATING NODE, DISTANCE METRIC ESTIMATING METHOD, AND PROGRAM

(75) Inventor: Shinji Nakadai, Tokyo (JP)

(73) Assignee: NEC Corporation, Tokyo (JP)

( * ) Notice: Subject to any disclaimer, the term of this patent is extended or adjusted under 35 U.S.C. 154(b) by 405 days.

(21) Appl. No.: 13/060,583

(22) PCT Filed: Jul. 8, 2009

(86) PCT No.: PCT/JP2009/062413
§ 371 (c)(1),
(2), (4) Date: Feb. 24, 2011

(87) PCT Pub. No.: WO2010/035565
PCT Pub. Date: Apr. 1, 2010

(65) Prior Publication Data
US 2011/0172956 A1    Jul. 14, 2011

(30) Foreign Application Priority Data

Sep. 29, 2008  (JP) ................................. 2008-249578

(51) Int. Cl.
*G01B 7/004* (2006.01)
*G01B 7/00* (2006.01)
*G01B 7/14* (2006.01)

(52) U.S. Cl.
USPC ............................ 702/158; 702/150; 702/155

(58) Field of Classification Search
USPC ........................................ 702/158, 150, 155
See application file for complete search history.

(56) References Cited

U.S. PATENT DOCUMENTS

2006/0087986 A1*  4/2006  Dube et al. .................... 370/255
2006/0259597 A1*  11/2006  Jiang et al. .................... 709/222
2008/0056163 A1*  3/2008  Chan et al. .................... 370/255

FOREIGN PATENT DOCUMENTS

JP          10-336206 A       12/1998
JP          2004248177 A       9/2004

OTHER PUBLICATIONS

International Search Report for PCT/JP2009/062413 mailed Aug. 4, 2009.
L. Tang et al., "Virtual Landmarks for the Internet", Proceeding of the 3rd ACM SIGCOMM conference on the Internet measurement (IMC'03), Oct. 27, 2003.
H. Lim et al., "Constructing Internet Coordinate System Based on Delay Measurement", Proceedings of he 3rd ACM SIGCOMM conference on Internet measurement (IMC'03), Oct. 27, 2003.

* cited by examiner

*Primary Examiner* — Sujoy Kundu
*Assistant Examiner* — Ricky Ngon
(74) *Attorney, Agent, or Firm* — Sughrue Mion, PLLC

(57) ABSTRACT

Shortest path searcher 105 searches shortest paths from each landmark node to other landmark nodes based on the measured values of distance metrics between the landmark nodes which are stored in distance metric storage 102, and calculates distance metrics along the discovered shortest paths. Coordinate generator 101a generates coordinate axes of a predetermined dimension number from the distance metrics along the shortest paths which are calculated by shortest path searcher 105. Coordinate calculator 104a calculates coordinates of a coordinate-to-be-calculated node from the distance metrics between the coordinate-to-be-calculated node and the landmark nodes and the coordinate axes generated by coordinate generator 101a. Distance metric estimator 134 estimates a distance metric between two coordinate-to-be-calculated nodes whose coordinates are calculated by coordinate calculator 104a, using the calculated coordinates.

14 Claims, 15 Drawing Sheets

▫ RELAY NODE   △ COORDINATE CALCULATING NODE
○ COORDINATE-TO-BE-   ● LANDMARK NODE
  CALCULATED NODE

Fig.10

DATA LOCATION STORAGE

| DATA | CLIENT |
|---|---|
| A | a, c |
| B | c, f, g |
| C | c, f |
| ... | ... |

Fig.11

COORDINATE STORAGE

|   | 1 | 2 | 3 |
|---|---|---|---|
| a | -176 | 57 | 12 |
| c | -319 | 101 | -111 |
| f |   |   |   |
| ... |   |   |   |

Fig.12

DELAY STORAGE

|   | A | B | C | D | E | F | G | H |
|---|---|---|---|---|---|---|---|---|
| A | 0.1 | 29 | 198 | 265 | 141 | 38 | 195 | 174 |
| B | 29 | 0.1 | 201 | 412 | 229 | 86 | 186 | 169 |
| C | 198 | 200 | 0.1 | 321 | 346 | 153 | 48 | 27 |
| D | 41 | 290 | 259 | 0.1 | 406 | 307 | 195 | 652 |
| E | 141 | 229 | 347 | 448 | 0.05 | 174 | 354 | 323 |
| F | 38 | 86 | 153 | 105 | 174 | 0.1 | 176 | 139 |
| G | 196 | 187 | 49 | 279 | 355 | 176 | 0.05 | 66 |
| H | 174 | 169 | 27 | 384 | 323 | 140 | 66 | 0.05 |

Fig.13

DELAYS ON SHORTEST PATHS

|   | A | B | C | D | E | F | G | H |
|---|---|---|---|---|---|---|---|---|
| A | 0.1 | 29 | 198 | 143 | 141 | 38 | 195 | 174 |
| B | 29 | 0.1 | 196 | 173 | 171 | 67 | 186 | 169 |
| C | 198 | 196 | 0.1 | 258 | 328 | 153 | 48 | 27 |
| D | 41 | 71 | 233 | 0.1 | 183 | 80 | 195 | 216 |
| E | 141 | 171 | 328 | 280 | 0.05 | 174 | 337 | 314 |
| F | 38 | 67 | 153 | 105 | 174 | 0.1 | 176 | 139 |
| G | 196 | 187 | 49 | 279 | 355 | 176 | 0.05 | 66 |
| H | 174 | 169 | 27 | 245 | 314 | 140 | 66 | 0.05 |

Fig.14

COORDINATE AXES

|   | A | B | C | D | E | F | G | H |
|---|---|---|---|---|---|---|---|---|
| 1 | -0.136 | -0.148 | -0.175 | -0.141 | -0.236 | -0.127 | -0.188 | -0.167 |
| 2 | -0.115 | -0.092 | 0.218 | -0.133 | -0.227 | -0.067 | 0.212 | 0.195 |
| 3 | -0.122 | -0.124 | 0.023 | -0.231 | 0.339 | -0.162 | 0.026 | -0.004 |

EXAMPLE OF PATHS ON RELAY NODE NETWORK WITH NO SHORTEST PATH SELECTED

DISTANCE METRIC OF PATH L1 < DISTANCE METRIC OF PATH L2 + DISTANCE METRIC OF PATH L3

※ ACTUAL SHORTEST PATH BETWEEN N1 AND N2: PATH VIA NODE N3

MEASURED DELAYS

|   | a   | b   | c   |
|---|-----|-----|-----|
| A | 23  | 70  | 258 |
| B | 15  | 74  | 217 |
| C | 207 | 114 | 345 |
| D | 502 | 51  | 257 |
| E | 159 | 206 | 65  |
| F | 56  | 39  | 231 |
| G | 197 | 137 | 338 |
| H | 183 | 101 | 321 |

Fig.17

DELAYS ON SHORTEST PATHS

|   | a | b | c |
|---|---|---|---|
| A | 23 | 70 | 207 |
| B | 15 | 74 | 217 |
| C | 207 | 114 | 345 |
| D | 161 | 51 | 257 |
| E | 159 | 206 | 65 |
| F | 56 | 39 | 231 |
| G | 197 | 137 | 338 |
| H | 183 | 101 | 321 |

Fig.18

CALCULATED COORDINATES

|   | a | b | c |
|---|---|---|---|
| 1 | -176 | -144 | -319 |
| 2 | 57 | 2 | 101 |
| 3 | 12 | 40 | -111 |

Fig.19

COORDINATES CALCULATED ACCORDING TO RELATED ART

|   | a | b | c |
|---|---|---|---|
| 1 | -230 | -123 | -287 |
| 2 | -53 | 36 | 98 |
| 3 | 121 | -26 | 77 |

ESTIMATED RESULTS PRODUCED USING
COORDINATES CALCULATED
ACCORDING TO PRESENT INVENTION

|   | a | b | c |
|---|---|---|---|
| a | 0 | 70 | 194 |
| b | 70 | 0 | 251 |
| c | 194 | 251 | 0 |

Fig.22

ESTIMATED RESULTS PRODUCED
USING COORDINATES CALCULATED
ACCORDING TO RELATED ART

|   | a   | b   | c   |
|---|-----|-----|-----|
| a | 0   | 202 | 167 |
| b | 202 | 0   | 203 |
| c | 167 | 203 | 0   |

Fig.23

MEASURED VALUES

|   | a   | b   | c   |
|---|-----|-----|-----|
| a | 0   | 86  | 261 |
| b | 86  | 0   | 228 |
| c | 260 | 224 | 0   |

DISTANCE METRIC ESTIMATING SYSTEM, COORDINATE CALCULATING NODE, DISTANCE METRIC ESTIMATING METHOD, AND PROGRAM

The present application is the National Phase of PCT/JP2009/062413, filed Jul. 8, 2009, which is based upon and claims the benefit of priority from Japanese patent application No. 2008-249578, filed on Sep. 29, 2008, the disclosure of which is incorporated herein in its entirety by reference.

TECHNICAL FIELD

The present invention relates to a distance metric estimating technology for estimating a distance metric between two nodes in a network such as a communication network, a traffic network, or the like.

BACKGROUND ART

For determining the distance between two points, a process may be employed to measure the coordinates (latitudes and longitudes) of the two points with a GPS (Global Positioning System) and to mathematically determine the distance between the two points from the measured coordinates. According to the GPS, radio waves transmitted from a plurality of satellites are received by a receiver, and the coordinates of the receiver are calculated based on the differences between the transmission and reception times of the radio waves.

A distance metric estimating system for estimating the distance metric between two nodes in a communication network according to similar principles is disclosed in Non-patent documents 1, 2. The distance metric refers to an index representative of the distance between the two nodes. In Non-patent documents 1, 2, a delay time is used as the distance metric.

As shown in FIG. 1, the distance metric estimating system disclosed in Non-patent documents 1, 2 includes coordinate calculating node 100, landmark nodes 110, 120, and coordinate-to-be-calculated nodes 130, 140. In FIG. 1, two landmark nodes and two coordinate-to-be-calculated nodes are shown for illustrative purposes. Actually, however, there are many landmark nodes and coordinate-to-be-calculated nodes involved, as shown in FIG. 2. In FIG. 2, the landmark nodes are represented by ●, coordinate calculating nodes by △, the coordinate-to-be-calculated nodes by ○, and relay nodes by □.

Landmark nodes 110, 120 play the role of a GPS satellite, and have distance metric acquirers 111, 121, respectively. Each of distance metric acquirers 111, 121 has a function to measure the distance metric between its own node and the other landmark node and to send distance metric information which includes the measured distance metric and information indicating the nodes to which the measured distance metric refers (inter-node information), to coordinate calculating node 100.

Coordinate-to-be-calculated nodes 130, 140 include respective distance metric acquirers 131, 141, respective coordinate requesters 132, 142, respective coordinate storages 133, 143, and distance metric estimators 134, 144.

Distance metric acquirers 131, 141 have a function to measure distance metrics between their own nodes and landmark nodes 110, 120 and to send distance metric information which includes the measured distance metrics and information indicating nodes to which the measured distance metrics refer, to respective coordinate requesters 132, 142. Coordinate requesters 132, 142 have a function to send coordinate requests including the distance metric information sent from distance metric acquirers 131, 141, to coordinate calculating node 100, and store the coordinates of their own nodes which have been returned from coordinate calculating node 100 in response to the coordinate requests, in respective coordinate storages 133, 143. Distance metric estimators 134, 144 acquire coordinates from the coordinate storages of two coordinate-to-be-calculated nodes, and calculate an Euclidean distance therebetween thereby to estimate the distance metric between the two coordinate-to-be-calculated nodes.

Coordinate calculating node 100 includes coordinate axis generator 101, distance metric storage 102, coordinate axis storage 103, and coordinate calculator 104.

Distance metric storage 102 stores the distance metric information between landmark nodes which is sent from landmark nodes 110, 120. Coordinate axis generator 101 has a function to compress the distance metric information stored in distance metric storage 102 into a predetermined dimension number to generate a coordinate axis, and store the generated coordinate axis in coordinate axis storage 103. Coordinate calculator 104 calculates coordinates of coordinate-to-be-calculated nodes 130, 140 based on the distance metric information included in coordinate requests sent from coordinate-to-be-calculated nodes 130, 140 and the coordinate axis stored in coordinate axis storage 103, and return the calculated coordinates to the request sources.

The distance metric estimating system thus configured which is disclosed in Non-patent documents 1, 2 operates as follows:

First, distance metric acquirers 111, 121 of landmark nodes 110, 120 measure distance metrics between their own nodes and the other landmark nodes. Specifically, distance metric acquirers 111, 121 send messages to the other landmark nodes, measure RTTs (Round Trip Times) until they receive responses to the messages, and set the measured RTTs as distance metrics. Thereafter, distance metric acquirers 111, 121 send distance metric information which includes the measured distance metrics and inter-node information indicating nodes to which the measured distance metrics refer to, to coordinate calculating node 100. The distance metric information is stored in distance metric storage 102 of coordinate calculating node 100.

When the process of storing the distance metric information in distance metric storage 102 is completed, coordinate axis generator 101 generates a coordinate axis based on the distance metric information stored in distance metric storage 102.

The coordinate axis generating process will be described below with reference to a flowchart shown in FIG. 3. Coordinate axis generator 101 acquires the distance metric information between landmark nodes from distance metric storage 102 (step 2401). At this time, coordinate axis generator 101 acquires the RTTs between all landmark nodes. Thereafter, coordinate axis generator 101 performs a linear dimensional compression process to compress the acquired distance metric information into a predetermined dimension number to generate a coordinate axis, and stores the generated coordinate axis in coordinate axis storage 103 (step 2402).

Coordinate axis generator 101 performs the linear dimensional compression process according to a PCA (Principal Component Analysis). The PCA refers to a process of acquiring, from multidimensionally distributed data, one or more axes for increasing the dispersion of the data. For example, the PCA can calculates one or more axes by way of SDV (Singular Value Decomposition) expressed by the equation (1) below. The SDV as applied to the distance metric estimating system is directed to a matrix D having elements in rows and columns which are represented by the distance metrics between all landmark nodes. Of an obtained orthogonal matrix U, the same number of columns as the predetermined number represent a coordinate axis U'. In the equation (1), W represents a singular value matrix, V an orthogonal matrix, and $V^T$ a transposed matrix of V.

$$D = U \cdot W \cdot V^T \quad (1)$$

If coordinate-to-be-calculated nodes 130, 140 need the coordinates of their own nodes, then distance metric acquirers 131, 141 measure distance metrics between their own nodes and all other landmark nodes 110, 120. Specifically, distance metric acquirers 131, 141 execute Ping on all other landmark nodes, for example, and regard the obtained results as distance metrics. When the measurement of the distance metrics between their own nodes and all other landmark nodes 110, 120, has been performed distance metric acquirers 131, 141 send distance metric information which includes the measured distance metrics and information indicating nodes to which the measured distance metrics refer, to respective coordinate requesters 132, 142. Coordinate requesters 132, 142 then send coordinate requests including the distance metric information sent from distance metric acquirers 131, 141 to coordinate calculating node 100.

When the coordinate requests are sent from coordinate-to-be-calculated nodes 130, 140, coordinate calculating node 100 acquires the coordinate axis U' from coordinate axis storage 103, and calculates the equation (2) shown below using the coordinate axis U' and the distance metric information d1, d2 included in the coordinate requests sent from coordinate-to-be-calculated nodes 130, 140, thereby calculating coordinates c1, c2 of coordinate-to-be-calculated nodes 130, 140. Then, coordinate calculating node 100 returns the calculated coordinates c1, c2 to coordinate-to-be-calculated nodes 130, 140 as request sources.

$$c_i = U'^T d_i \quad (2)$$

Coordinate requesters 132, 142 of respective coordinate-to-be-calculated nodes 130, 140 store the coordinates c1, c2 returned from coordinate calculating node 100 in respective coordinate storages 133, 143.

When distance metric estimator 134 of coordinate-to-be-calculated node 130 needs to estimate a distance metric between its own node and another coordinate-to-be-calculated node (which is assumed to be coordinate-to-be-calculated node 140), distance metric estimator 134 acquires the coordinates c1, c2 of coordinate-to-be-calculated nodes 130, 140 from coordinate storages 133, 143, and calculates the equation (3) shown below for determining a Euclidean distance between coordinate-to-be-calculated nodes 130, 140 thereby eliminating distance metric t12 between coordinate-to-be-calculated nodes 130, 140.

$$t_{12} = \|c_1 - c_2\| \quad (3)$$

PRIOR TECHNICAL DOCUMENTS

Non-Patent Documents

Non-patent document 1: Hyuk Lim, Jennifer C. Hou, Chong-Ho Choi, "Constructing Internet Coordinate System Based on Delay Measurement", Proceedings of the 3rd ACM SIGCOMM conference on Internet measurement (IMC '03), Oct. 27, 2003.

Non-patent document 2: Liying Tang, Mark Crovella, "Virtual Landmarks for the Internet", Proceedings of the 3rd ACM SIGCOMM conference on Internet measurement (IMC '03), Oct. 27, 2003.

SUMMARY OF THE INVENTION

Problems to be Solved by the Invention

Networks such as the Internet have such a property to select the shortest path when a path between two nodes is to be determined. According to the technology disclosed in Non-patent documents 1, 2, an actually measured delay time (distance metric) between landmark nodes is considered to be a delay time along the shortest path, and a distance metric between two nodes is estimated using the measured value.

However, an investigation in PlanetLab of a delay time along a path that is selected for direct communications between two nodes and a delay time along a shortest path for communications therebetween via another node, has discovered that there are many instances wherein the delay time is longer for direct communications between two nodes, as shown in FIG. 4. This indicates that the shortest path may not be selected when a path between two nodes is to be determined. In FIG. 4, the horizontal axis represents the ratio (delay time for direct communications between two nodes/delay time for communications via another node), and the vertical axis represents an cumulative frequency distribution.

Accordingly, the actually measured delay time between landmark notes includes the delay time along a non-shortest path. The distance metric along the non-shortest path is information which is noise for networks such as the Internet have such a property to select a shortest path. The technology disclosed in Non-patent documents 1, 2 has been disadvantageous in that the measuring accuracy is low because it estimates the delay time between nodes using measured results which include the delay time along the non-shortest path which acts as noise for networks.

It is an object of the present invention to provide a distance metric estimating system which will solve the problem, described above, such that the accuracy with which to measure a distance metric between nodes is low.

Means for Solving the Problems:

A distance metric estimating system according to the present invention comprises:

a distance metric storage for storing distance metrics determined between each landmark node and other landmark nodes which are present on a network;

shortest path searching means for searching for shortest paths from each landmark node to other landmark nodes based on the distance metrics between the landmark nodes which are stored in said distance metric storage, and calculating first distance metrics along the discovered shortest paths;

coordinate axis generating means for generating coordinate axes of a predetermined dimension number from the first distance metrics along the shortest paths which are calculated by said shortest path searching means;

coordinate calculating means for calculating coordinates of a coordinate-to-be-calculated node from distance metrics between said coordinate-to-be-calculated node and the landmark nodes which are present on the network and the coordinate axes generated by said coordinate axis generating means; and distance metric estimating means for estimating a distance metric between two coordinate-to-be-calculated nodes whose coordinates are calculated by said coordinate calculating means, using the calculated coordinates.

A coordinate calculating node according to the present invention comprises:

a distance metric storage for storing distance metrics determined between each landmark node and other landmark nodes which are present on a network;

a shortest path searching means for searching for shortest paths from each landmark node to other landmark nodes based on the distance metrics between the landmark nodes which are stored in said distance metric storage, and calculating first distance metrics along the discovered shortest paths;

coordinate axis generating means for generating coordinate axes of a predetermined dimension number from the first distance metrics along the shortest paths which are calculated by said shortest path searching means; and coordinate calculating means for calculating coordinates of a coordinate-to-be-calculated node from distance metrics between said coordinate-to-be-calculated node and the landmark nodes which are present on the network and the coordinate axes generated by said coordinate axis generating means.

A distance metric estimating method according to the present invention, which provides a distance metric storage for storing distance metrics determined between each landmark node and other landmark nodes which are present on a network, comprises:

the first step in which shortest path searching means searches for shortest paths from each landmark node to other landmark nodes based on the distance metrics between the landmark nodes which are stored in said distance metric storage, and calculates first distance metrics along the discovered shortest paths;

the second step in which coordinate axis generating means generates coordinate axes of a predetermined dimension number from the first distance metrics along the shortest paths which are calculated in said first step;

the third step in which coordinate calculating means calculates coordinates of a coordinate-to-be-calculated node from distance metrics between said coordinate-to-be-calculated node and the landmark nodes which are present on the network and the coordinate axes generated in said second step; and the fourth step in which distance metric estimating means estimates a distance metric between two coordinate-to-be-calculated nodes whose coordinates are calculated in said third step, using the calculated coordinates.

A program according to the present invention for enabling a computer including a distance metric storage for storing distance metrics determined between each landmark node and other landmark nodes which are present on a network, to function as a coordinate calculating node, enables said computer to function as:

shortest path searching means for searching for shortest paths from each landmark node to other landmark nodes based on the distance metrics between the landmark nodes which are stored in said distance metric storage, and calculating first distance metrics along the discovered shortest paths;

coordinate axis generating means for generating coordinate axes of a predetermined dimension number from the first distance metrics along the shortest paths which are calculated by said shortest path searching means;

coordinate calculating means for calculating coordinates of a coordinate-to-be-calculated node from distance metrics between said coordinate-to-be-calculated node and the landmark nodes which are present on the network and the coordinate axes generated by said coordinate axis generating means; and distance metric estimating means for estimating a distance metric between two coordinate-to-be-calculated nodes whose coordinates are calculated by said coordinate calculating means, using the calculated coordinates.

Advantages of the Invention:

According to the present invention, a distance metric between any two nodes on a network can be estimated accurately.

BRIEF DESCRIPTION OF THE DRAWINGS

FIG. 10 is a diagram showing an example of content of a data location storage;

FIG. 11 is a diagram showing an example of content of a coordinate storage;

FIG. 12 is a diagram showing an example of content of a delay storage;

FIG. 13 is a diagram showing delay times along a shortest path which is generated by a shortest path searcher based on information stored in the delay storage;

FIG. 14 is a diagram showing an example of coordinate axes generated by a coordinate axis generator;

FIG. 17 is a diagram showing delay times along a shortest path calculated based on the measured results produced by a delay measurer;

FIG. 18 is a diagram showing an example of coordinates calculated by a coordinate calculator;

FIG. 19 is a diagram showing an example of coordinates calculated by the technology disclosed in Non-patent documents 1, 2;

FIG. 22 is a diagram showing inter-client delay times estimated by the technology disclosed in Non-patent documents 1, 2;

FIG. 23 is a diagram showing measured values of delay times;

MODE FOR CARRYING OUT THE INVENTION

A best mode for carrying out the present invention will be described in detail below with reference to the drawings.

(First Exemplary Embodiment)

Figure 1:
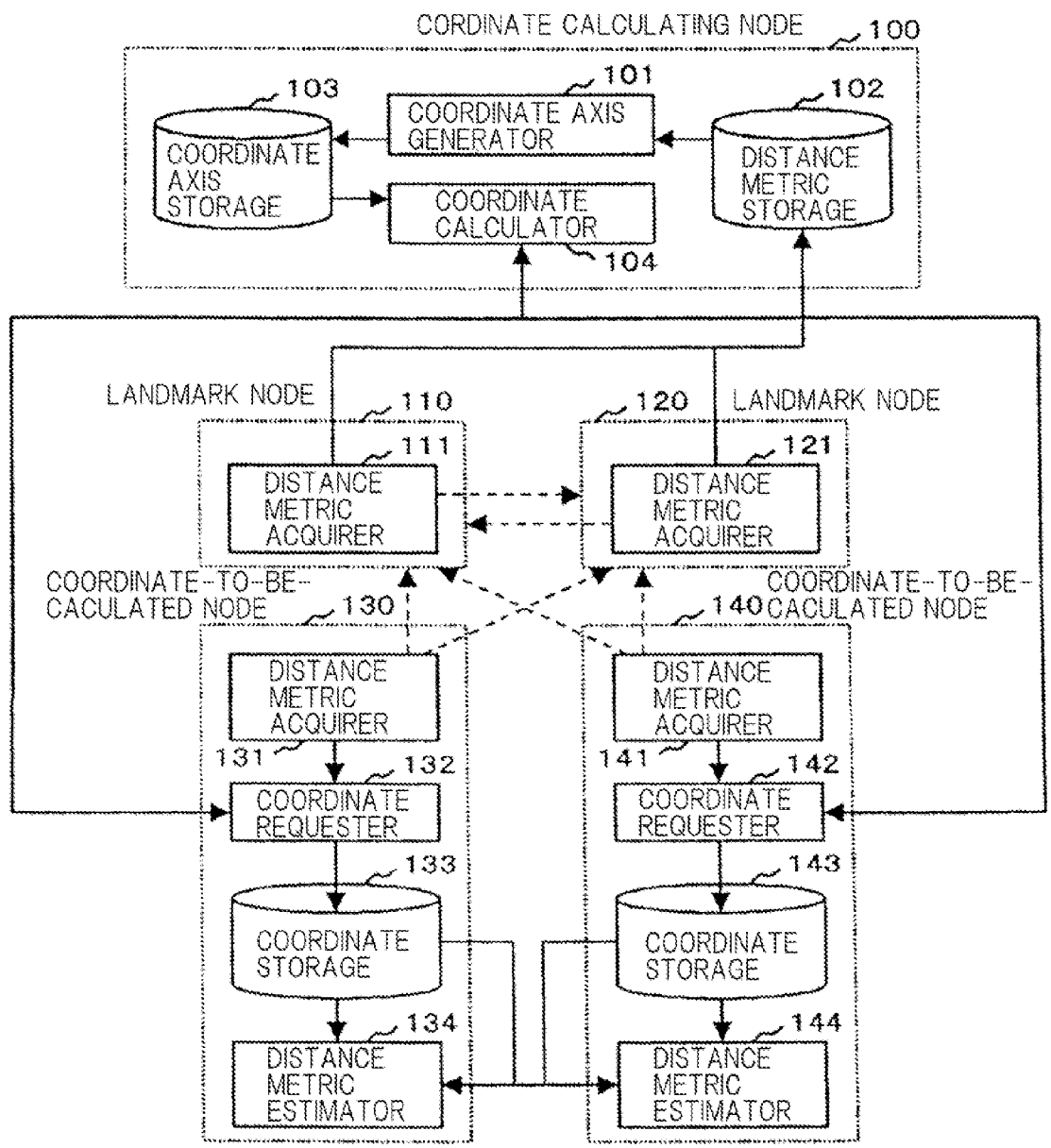
FIG. 1 is a block diagram illustrative of the technology disclosed in Non-patent documents 1, 2.
Figure 2:
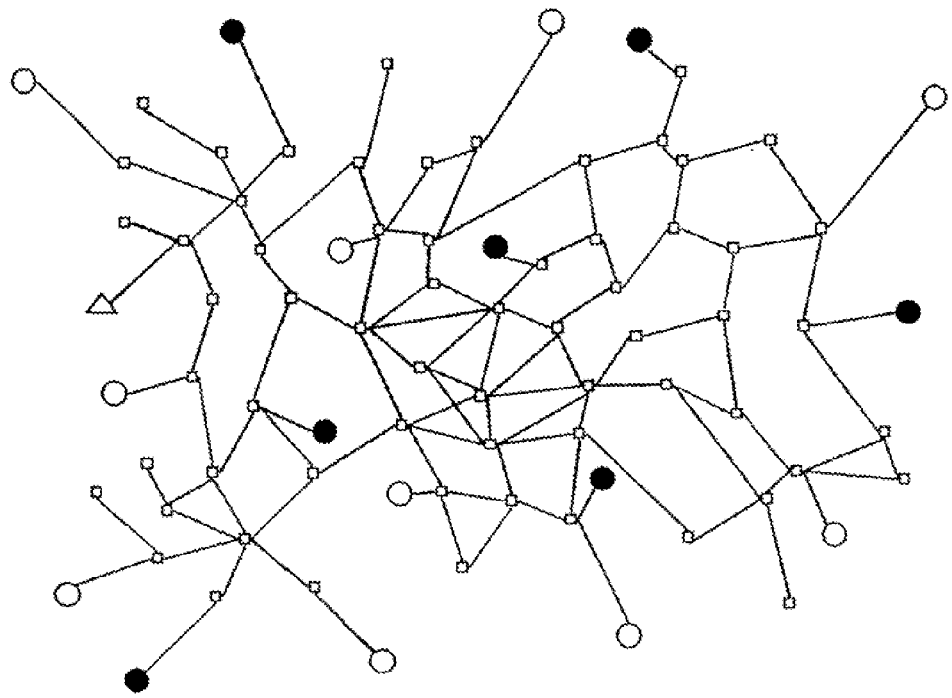
FIG. 2 is a diagram showing an example of a network for estimating a distance metric.
Figure 3:
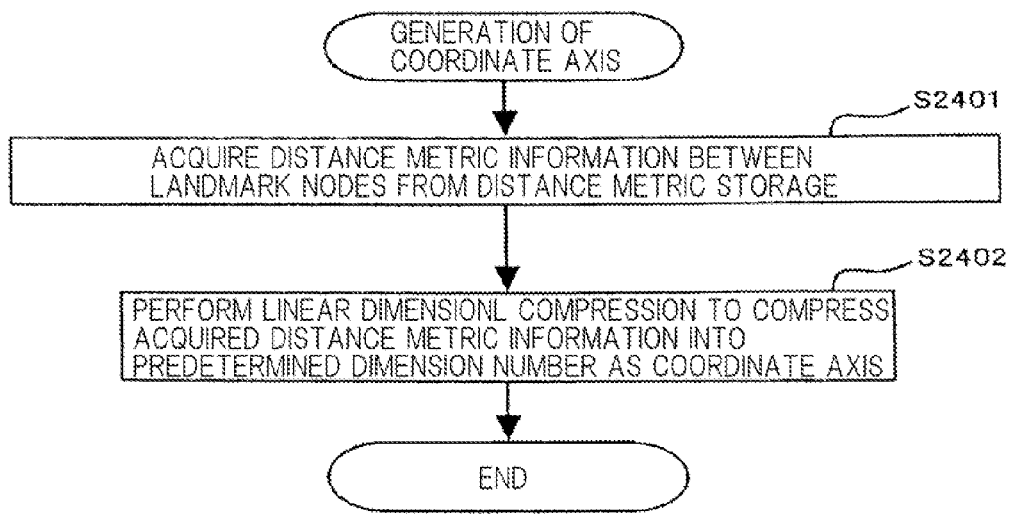
FIG. 3 is a flowchart of a processing sequence for generating a coordinate axis.
Figure 4:
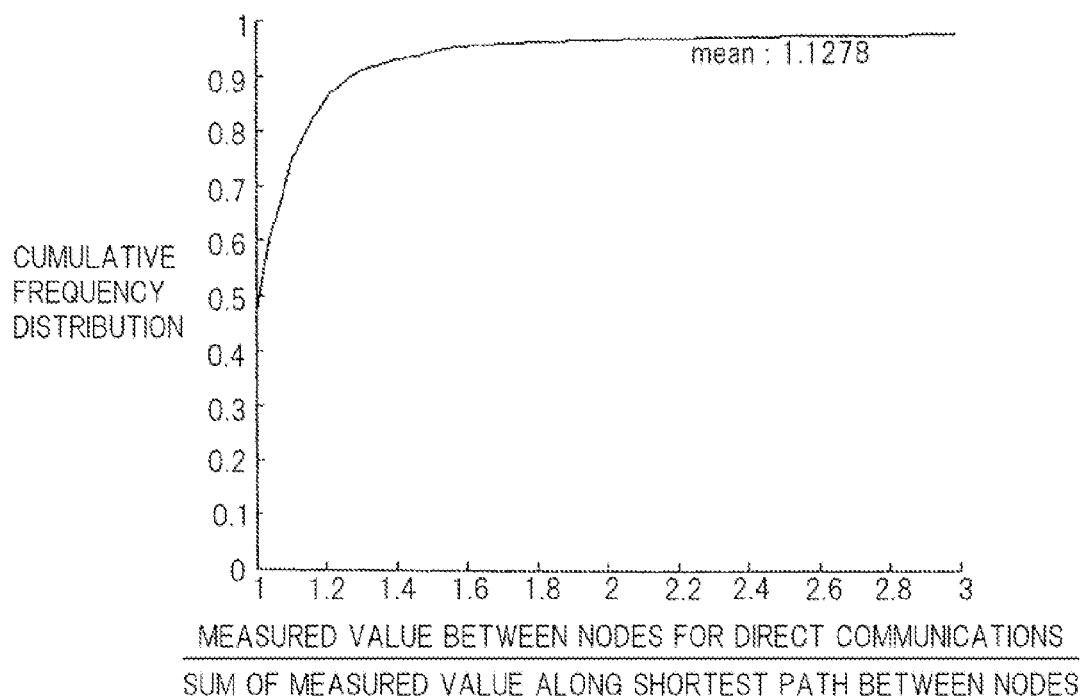
FIG. 4 is a graph showing the ratio of a delay time for direct communications between two nodes and a delay time for communications on a shortest path.
Figure 5:
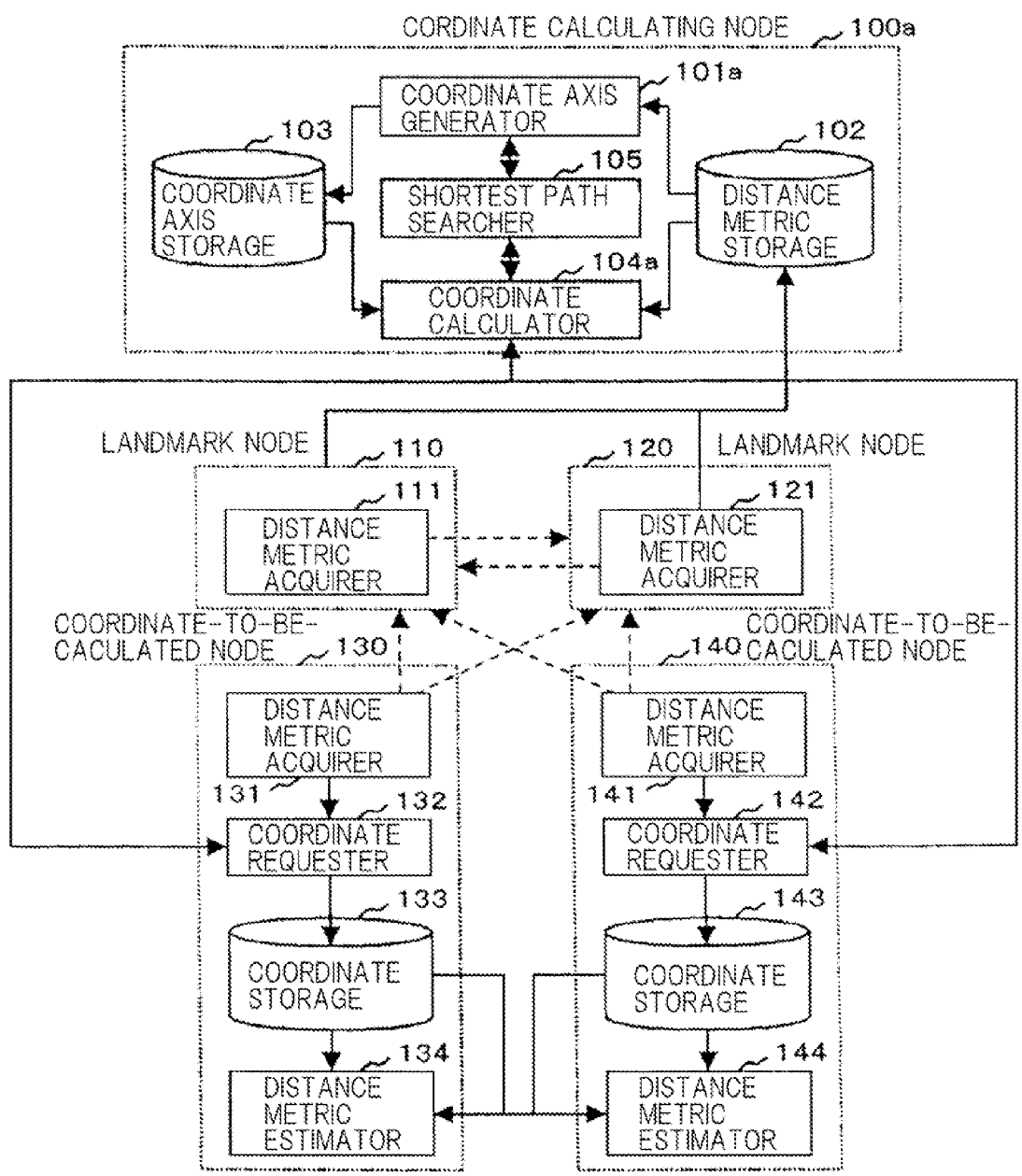
FIG. 5 is a block diagram of the configuration of a distance metric estimating system according to a first exemplary embodiment of the present invention.

As shown in FIG. 5, a distance metric estimating system according to the present invention is different from the distance metric estimating system shown in FIG. 1 in that it has coordinate calculating node 100a instead of coordinate calculating node 100. In FIG. 5, two landmark nodes and two coordinate-to-be-calculated nodes are shown for illustrative purposes. Actually, however, there are many landmark nodes and coordinate-to-be-calculated nodes involved, as shown in FIG. 2.

Coordinate calculating node 100a is different from coordinate calculating node 100 shown in FIG. 1 in that it includes coordinate axis generator 101a and coordinate calculator 104a instead of coordinate axis generator 101 and coordinate calculator 104, respectively, and additionally shortest path searcher 105.

Coordinate axis generator 101a is different from coordinate axis generator 101 shown in FIG. 1 in that it does not generate a coordinate axis directly from the distance metric information between landmark nodes which is stored in distance metric storage 102, but generates a coordinate axis using distance metric information along the shortest path between landmark nodes which is determined by giving the distance metric information to shortest path searcher 105.

Coordinate calculator 104a is different from coordinate calculator 104 shown in FIG. 1 in that it does not calculate coordinates directly from distance metric information between coordinate-to-be-calculated node 130 and landmark nodes 110, 120 which has been sent from a coordinate-to-be-calculated node (e.g., coordinate-to-be-calculated node 130), but calculates coordinates of coordinate-to-be-calculated node 130 using distance metric information along the shortest path between coordinate-to-be-calculated node 130 and landmark nodes 110, 120 which has been determined by giving the above distance metric information and distance metric information between landmark nodes which is stored in distance metric storage 102, to shortest path searcher 105.

When shortest path searcher 105 is given distance metric information between landmark nodes from coordinate axis generator 101a, it searches for the shortest path from each landmark node to another landmark node, and returns distance metric information of the discovered shortest path to coordinate axis generator 101a. When shortest path searcher 105 is given distance metric information between a coordinate-to-be-calculated node and a landmark node and distance metric information between landmark nodes from coordinate calculator 104a, it searches for the shortest path between the coordinate-to-be-calculated node and each landmark node, and returns distance metric information of the discovered shortest path to coordinate calculator 104a. The shortest path can be searched for according to the Dijkstra algorithm, for example.

Coordinate calculating node 100a having such a function can be implemented by a computer operable under program control. Specifically, a recording medium such as a disk, a semiconductor memory, or the like is prepared which stores a program for enabling a computer to function as coordinate axis generator 101a, coordinate calculator 104a, and shortest path searcher 105, and the program is read by the computer. According to the read program, the computer controls its own operation to realize coordinate axis generator 101a, coordinate calculator 104a, and shortest path searcher 105 thereon. Landmark nodes 110, 120 and coordinate-to-be-calculated nodes 130, 140 can also be implemented by computers operable under program control.

The configurations of nodes 100a, 110, 120, 130, 140 shown in FIG. 5 are given by way of example only, and various modifications may be made therein. For example, all or some of the components of the coordinate calculating node may be included in landmark nodes, and information may be dispersively exchanged between the landmark nodes. The coordinate storages and the distance metric estimating means as components of the coordinate-to-be-calculated nodes may be managed by landmark nodes 110, 120. Though there are countless possible combinations of such modifications, it is necessary that the functions be dispersed to the extent that each node on a network is capable of sufficiently acquiring a distance metric with another node. For example, if a delay is to be estimated using Ping on the Internet, then it is necessary that Ping executing means as distance metric acquiring means be dispersed in all landmark nodes and all coordinate-to-be-calculated nodes. A processing sequence for calculating coordinates from measured results may be carried out dispersively by a plurality of nodes or may be carried out intensively by a particular node.

Operation of the present exemplary embodiment will be described in detail below.

Figure 6:
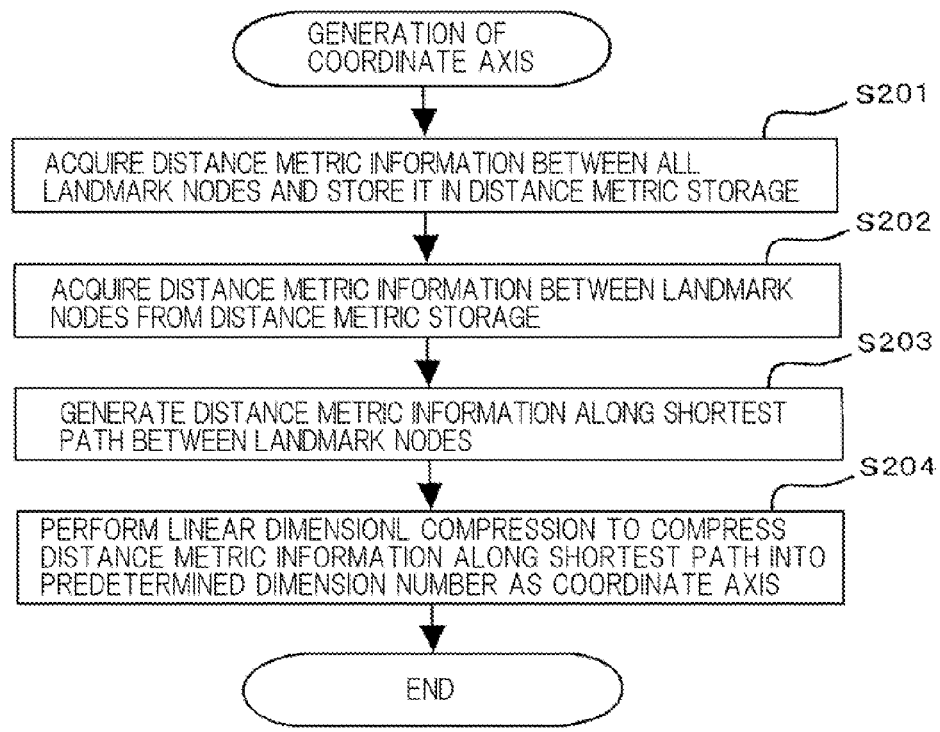
FIG. 6 is a flowchart of a processing sequence for generating a coordinate axis.

A processing sequence for generating a coordinate axis will first be described below with reference to a flowchart shown in FIG. 6.

First, each of distance metric acquirers 111, 121 of landmark nodes 110, 120 measures a distance metric between its own node and the other landmark node and sends distance metric information which includes the measured distance metric and inter-node information indicating the nodes to which the measured distance metric refers, to coordinate calculating node 100a. The distance metric information between the landmark nodes is stored in distance metric storage 102 of coordinate calculating node 100a (step 201).

Then, coordinate axis generator 101a of coordinate calculating node 100a acquires the distance metric information between the landmark nodes from distance metric storage 102 (step 202).

Thereafter, coordinate axis generator 101a transfers the distance metric information acquired in step 202 to shortest path searcher 105, requesting shortest path searcher 105 to generate distance metric information along the shortest path between the landmark nodes. Shortest path searcher 105 searches for the shortest path from each landmark node to another landmark node, and returns distance metric information of the discovered shortest path to coordinate axis generator 101a (step 203).

Thereafter, coordinate axis generator 101a performs a linear dimensional compression process to compress the distance metric information along the shortest path between the landmark nodes which has been returned from shortest path searcher 105, into a predetermined dimension number according to the equation (1) referred to above to generate a coordinate axis. Finally, coordinate axis generator 101a stores the generated coordinate axis in coordinate axis storage 103 (step 204). The process of generating a coordinate axis is not limited to the singular value decomposition represented by the equation (1), but may be eigenvalue decomposition or multidimensional scaling (MDS).

Figure 7:
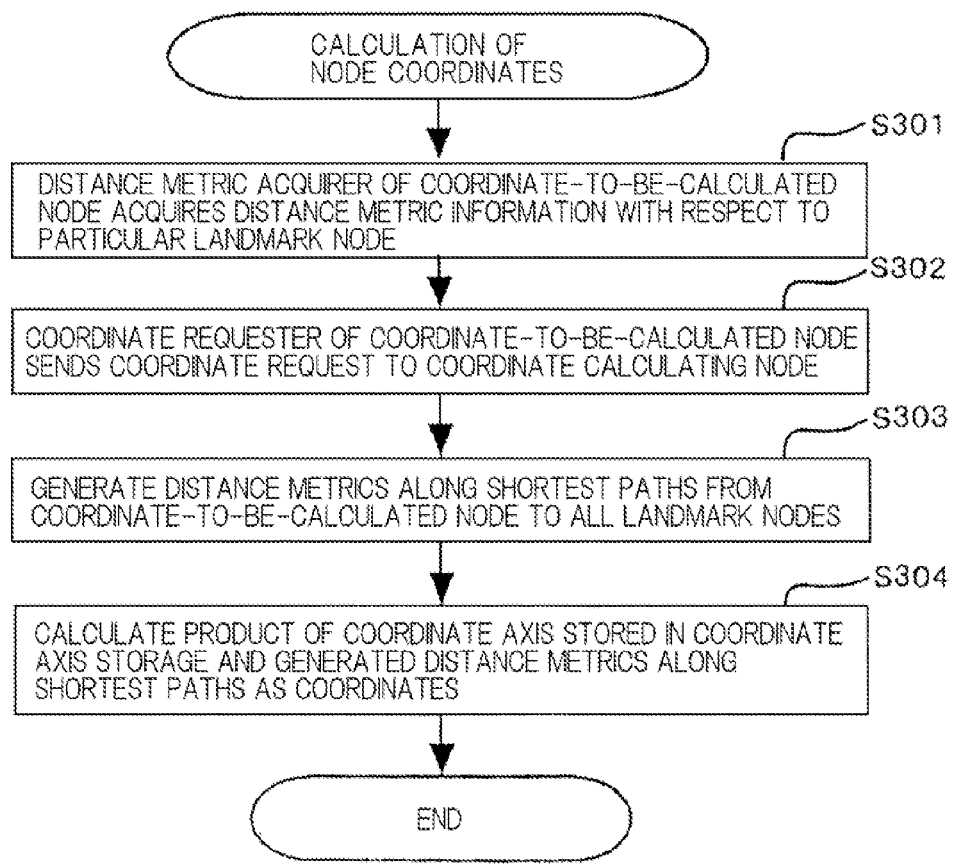
FIG. 7 is a flowchart of a processing sequence for generating coordinates.

A processing sequence for generating coordinates of a coordinate-to-be-calculated node will be described below with reference to a flowchart shown in FIG. 7.

For calculating coordinates of a coordinate-to-be-calculated node (e.g., coordinate-to-be-calculated node 130), distance metric acquirer 131 of coordinate-to-be-calculated node 130 measures distance metrics between its own node and a plurality of certain landmark nodes, and transfers distance metric information which includes the measured distance metrics and information indicating the nodes to which the measured distance metrics refer, to coordinate requester 132 (step 301). Coordinate requester 132 then sends a coordinate request including the distance metric information to coordinate calculating node 100a (step 302).

Coordinate calculator 104a of coordinate calculating node 100a transfer the received distance metric information and the distance metric information between all the landmarks which is stored in distance metric storage 102 to shortest path searcher 105. Shortest path searcher 105 then searches for distance metric information along the shortest paths from coordinate-to-be-calculated node 130 to all the landmark nodes (step 303).

Thereafter, coordinate calculator 104a calculates the equation (2) referred to above with respect to the coordinate axis stored in coordinate axis storage 103 and the distance metrics along the shortest paths which have been generated by shortest path searcher 105, and calculates their products as coordinates. Then, coordinate calculator 104a returns the calculated coordinates to coordinate-to-be-calculated node 130 as a request source (step 304). In coordinate-to-be-calculated node 130, coordinate requester 132 stores the coordinates returned from coordinate calculating node 100a in coordinate storage 133.

Figure 8:
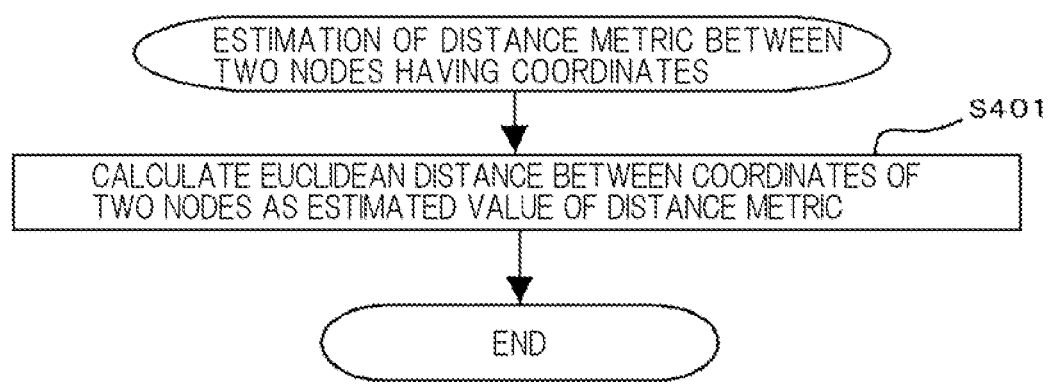
FIG. 8 is a flowchart of a processing sequence for estimating a distance metric between coordinate-to-be-calculated nodes.

A processing sequence for estimating a distance metric between coordinate-to-be-calculated nodes will be described below with reference to a flowchart shown in FIG. 8.

When a coordinate-to-be-calculated node (e.g., coordinate-to-be-calculated node 130) is to estimate a distance metric between itself and another coordinate-to-be-calculated node (e.g., coordinate-to-be-calculated node 140), distance metric estimator 134 acquires the coordinates of nodes 130, 140 which are stored in coordinate storages 133, 143, and calculates Euclidean coordinates thereof to estimate a distance metric between nodes 130, 140 (step 401). Specifically, distance metric estimator 134 calculates the equation (3) referred to above to estimate a distance metric between nodes 130, 140.

(Advantages of the First Exemplary Embodiment)

According to the present exemplary embodiment, a distance metric between coordinate-to-be-calculated nodes on a network can be estimated accurately for the reason that coordinate axis generator 100a generates a coordinate axis, not using measured distance metrics (including distance metrics along non-shortest paths) between landmark nodes, but using a distance metric along a shortest path calculated by shortest path searcher 105 based on measured distance metrics. In other words, distance metrics along non-shortest paths which act as noise in a network for calculating a shortest path are converted into a distance metric along the shortest path by shortest path searcher 105, and then a coordinate axis is generated. Since adverse effects, which distance metrics along non-shortest paths have, are reduced, the distance metric can be estimated with higher accuracy.

According to the present exemplary embodiment, furthermore, coordinate calculator 104a calculates coordinates of a coordinate-to-be-calculated node, not using a measured distance metric between the coordinate-to-be-calculated node and a landmark node, but using a distance metric along a shortest path calculated by shortest path searcher 105 based on a measured distance metric. the distance metric can be estimated with much higher accuracy.

According, to the present exemplary embodiment, moreover, coordinate calculator 104a can calculate coordinates without the need for measuring distance metrics between a coordinate-to-be-calculated node and all landmark nodes for the reason that even if a distance metric between particular landmark nodes is absent, shortest path searcher 105 can make up for the absent distance metric with a distance metric along a shortest path via another landmark node.

According to the present exemplary embodiment, furthermore, in a network of landmark nodes and coordinate-to-be-calculated nodes (overlay network), it is possible to estimate a distance metric in the case where landmark nodes and coordinate-to-be-calculated nodes take a bypass path which serves as the shortest path, for the reason that a process for performing the shortest path search of shortest path searcher 105 on a measured distance metric between landmark nodes and calculating a distance metric along the shortest path is simulative of accumulated delays for data that are actually transferred on a network.

(Second Exemplary Embodiment)

A distance metric estimating system according to a second exemplary embodiment of the present invention will be described in detail below.

The present exemplary embodiment resides in that when a client is to acquire content such as visual content, it can acquire content from a node closest to itself among nodes which hold such content. Though the above nodes may be in the form of distribution-dedicated servers or may be in the form of other clients for peer-to-peer data exchanges, the latter form is employed in the present exemplary embodiment. Delay data in the present exemplary embodiment employ measured values between servers on the global Internet called PlanetLab, and experimental results according to the present invention are based on those measured values.

Figure 9:
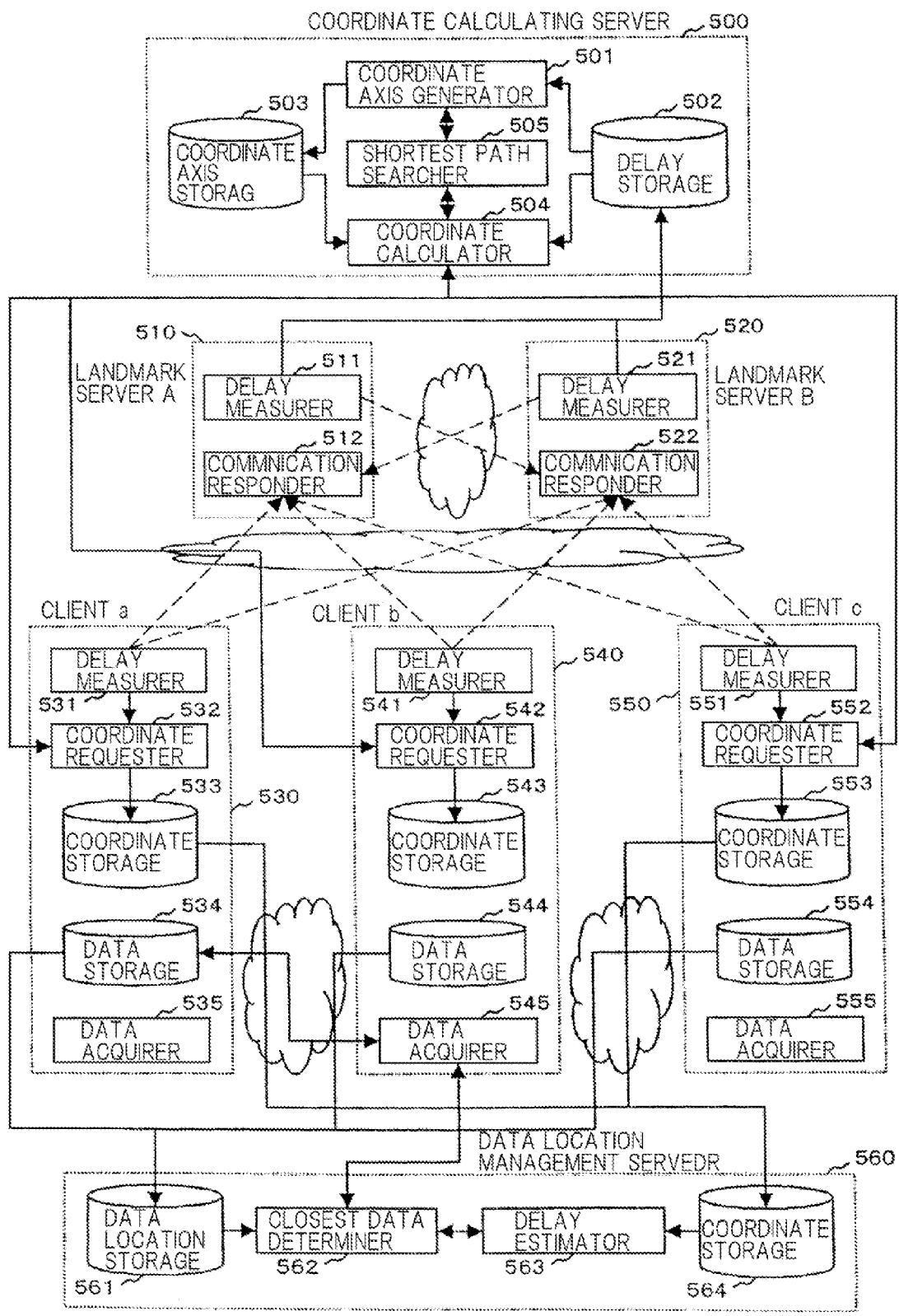
FIG. 9 is a block diagram of the configuration of a distance metric estimating system according to a second exemplary embodiment of the present invention.

As shown in FIG. 9, the distance metric estimating system according to the present exemplary embodiment comprises coordinate calculating server 500, a plurality of landmark servers 510, 520, a plurality of clients 530, 540, 550, and data location management server 560, which are connected to each other in a network.

Coordinate calculating server 500 includes coordinate generator 501, delay storage 502, coordinate axis storage 305, coordinate calculator 504, and shortest path searcher 505. These components are identical in configuration to coordinate axis generator 101a, distance metric storage 102, coordinate axis storage 103, coordinate calculator 104a, and shortest path searcher 105 shown in FIG. 5.

Landmark servers 510 include respective delay measurers 511, 521 and respective communication responders 512, 522.

Each of delay measurers 511, 521 has a function to execute a Ping command thereby to measure a delay time between its own server and another landmark server and store the measured result in delay storage 502 of coordinate calculating server 500. Each of communication responders 512, 522 has a function to receive a delay measurement message from another landmark server or client and return a response.

Clients 530, 540, 55 include respective delay measurers 531, 541, 551, respective coordinate requesters 532, 542, 552, respective coordinate storages 533, 543, 553, respective data storages 534, 544, 554, and respective data acquirers 535, 545, 555.

Delay measurers 531, 541, 551 have a function to execute a Ping command to measure delay times between their own clients and landmark servers 510, 520 and transfer the measured results to coordinate requesters 532, 542, 552. Coordinate requesters 532, 542, 552 have a function to send a coordinate request including the measured results transferred from delay measurers 531, 541, 551 to coordinate calculating server 500, and store the coordinates of their own clients which are returned from coordinate calculating server 500 in response to the coordinate request in coordinate storages 533, 543, 553. Data storages 534, 544, 554 store content such as visual content. Data acquirers 535, 545, 555 have a function to send a closest content inquiry including a content identifier of content for which a view request has occurred and the coordinates of their own clients to data location management server 560, and a function to acquire content from a client identified by a client identifier that has been returned from data location management server 560 in response to the closest content inquiry.

Data location management server 560 includes data location storage 561, closest data determiner 562, delay estimator 563, and coordinate storage 564.

Data location management server 560 registers therein content identifiers for identifying content and client identifiers for identifying clients which hold the content, which are related to each other.

FIG. 10 shows an example of the content of data location storage 561.

The first row of the example indicates that contents identified by content identifier "A" is carried by clients identified by client identifiers "a", "c". It is assumed below that clients 530, 540, 550 are identified respectively by client identifiers "a", "b", "c". The clients identified respectively by client identifiers "a", "b", "c" may hereinafter be referred to as clients a, b, c.

Coordinate storage 564 registers therein clients whose client identifiers are stored in data location storage 561.

FIG. 11 shows an example of the contents of coordinate storage 564.

Closest data determiner 562 has a function to search data location storage 561 for a client that holds contents identified by a contents identifier in a closest contents inquiry sent from a client, a function to transfer the coordinates of the client as an inquiry source and the client identifier discovered from data location storage 561 to delay estimator 563 to ask delay estimator 563 to estimate a delay time (distance metric) between clients, and a function to determine the closest client from the client as the inquiry source, which carries the contents, based on the delay time estimated by delay estimator 563, and return the client identifier of the determined client to the client as the inquiry source.

Delay estimator 563 has a function to search coordinate storage 564 for the coordinates of the client identified by the client identifier transferred from closest data determiner 562, and a function to determine a Euclidean distance between the discovered coordinates and the coordinates of the client as the inquiry source thereby to estimate delay time between the clients.

Operation of the present exemplary embodiment will be described in detail below.

First, a process of generating a coordinate axis required to calculate coordinates will first be described below.

In the process of generating a coordinate axis, delay measurers 511, 521 of landmark servers 510, 520 measure delay times between their own landmark servers and other landmark servers, and store the measured results in delay storage 502 of coordinate calculating server 500. The measured results representative of the delay times stored in delay storage 502 are shown in FIG. 12.

In FIG. 12, A through H represent the identifiers of landmark servers and numbers represent delay times (in a unit of msec.). A landmark server having an identifier A may hereinafter be referred to as landmark server A.

Then, coordinate axis generator 501 transfers the measured results of the delay times between landmark servers which are stored in delay storage 502 to shortest path searcher 505 to enable shortest path searcher 505 to calculate delay times along shortest paths between landmark servers. The delay times calculated along shortest paths between landmark servers are shown in FIG. 13.

The measured value of the delay time from landmark server A to landmark server B is 265 msec. as shown in FIG. 12. The delay time along the shortest path from landmark server A to landmark server D is 143 msec. as shown in FIG. 13.

Specifically, the shortest path from landmark server A to landmark server D is represented by landmark servers A to F to D. Since the delay time from landmark server A to landmark server F is 38 msec., and the delay time from landmark server F to landmark server D is 105 msec., the delay time along the shortest path from landmark server A to landmark server D is the sum of the above delay times, i.e., 143 msec. Thereafter, coordinate axis generator 501 performs a principal component analysis by way of singular value decomposition on the information of the delay times along the shortest paths shown in FIG. 13, and extracts three primary coordinate axes, and stores the extracted three primary coordinate axes in coordinate axis storage 503. The three primary coordinate axes stored in coordinate axis storage 503 are shown in FIG. 14. The number of extracted coordinate axes is not limited to three.

The reasons for generating a coordinate axis using a delay time along the shortest path will be described below with reference to FIG. 15. A relay node group selects path L1 as a path between node N1 and node N2. Path L1 suffers factor X which increases the delay. Since factor X is localized, it is ignored in a global area, and it is desirable to compress dimensions leaving a property of the overall network to select the shortest paths, thereby generating a coordinate axis. The delay time between node N1 and node N2 is thus desirably a delay time along the shortest path, but not a delay time along path L1. However, a delay time cannot be measured with relay node settings being changed. A path via node N3 is then considered according to an approximate approach. If the sum of the delay time along path L2 and the delay time along path L3 is smaller than the delay time along path L1, then the delay time along path L1 is converted into the sum of the delay time along path L2 and the delay time along path L3, and a dimensional compression process is performed thereon to generate a coordinate axis while keeping the property of the overall network to select shortest paths.

A process of determining coordinates of clients 530, 540, 550 having client identifiers a, b, c will be described below. First, delay measurers 531, 541, 55a of clients a, b, c measure delay times between their own clients and the landmark servers. The delay times measured by clients a, b, c are shown in FIG. 16.

Figures 15, 16:
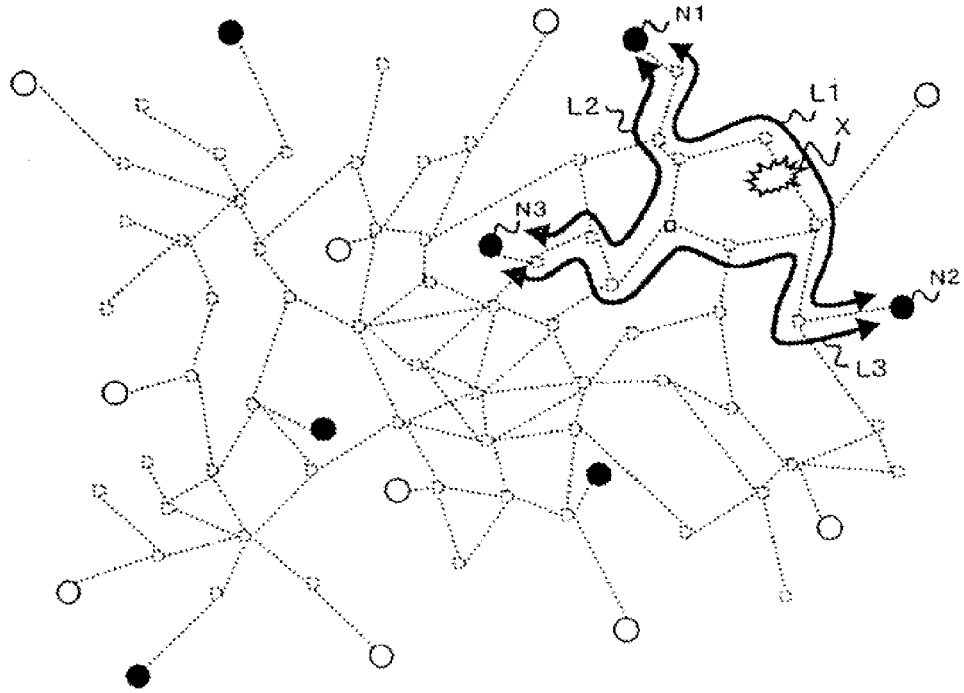
FIG. 15 is a diagram illustrative of problems of the technology disclosed in Non-patent documents 1, 2.
FIG. 16 is a diagram showing measured results produced by a delay measurer.

FIG. 16 shows measured results of delay times which are produced by clients a, b, c with respect to client servers A through H. For example, the measured result of the delay time which is produced by client a with respect to landmark server A is 23 msec.

Thereafter, coordinate requesters 532, 542, 552 of clients a, b, c send coordinate requests including the delay times measured by delay measurers 531, 541, 551 to coordinate calculating server 500. For example, the coordinate request sent by client a includes delay times (23, 15, 207, 502, 159, 56, 197, 183).

In response to the coordinate requests sent from clients a, b, c, coordinate calculator 504 of coordinate calculating server 500 performs a process, to be described below, successively on the coordinate requests. First, coordinate calculator 504 transfers the delay time included in the coordinate request from client a and the information of the delay times shown in FIG. 12 which are taken from delay storage 502, to shortest path searcher 505. Shortest path searcher 505 then calculates delay times along shortest paths from client a to landmark servers A through H.

The first column of FIG. 17 shows the delay times along the shortest paths from client a to landmark servers A through H.

The delay time from client a to landmark server D is updated from 502 msec. to 161 msec. The delay time of 161 msec. is the sum of the delay time of 56 msec. from client a to landmark server F and the delay time of 105 msec. from landmark server F to landmark server D.

Thereafter, coordinate calculator 504 determines the product of the delay times along the shortest paths from client a to landmark servers A through H (see the first column of FIG. 17) and the coordinate axes stored in coordinate axis storage 503 (see FIG. 14), thereby calculating coordinates of client a. The coordinates of client a are shown by the first column of FIG. 18. Coordinate calculator 504 sends the calculated coordinates to client a, in which coordinate requester 532 stores the coordinates sent from coordinate calculating server 500 in coordinate storage 533.

Thereafter, coordinate calculator 504 performs the same process as described above successively on the coordinate requests sent from clients b, c. The delay times shown by the second and third columns of FIG. 17 are calculated as delay times along the shortest paths from clients b, c to landmark servers A through H, and the coordinates shown by the second and third rows of FIG. 18 are calculated as coordinates of clients a, b, c.

The coordinates of clients a, b, c which are determined by the technology disclosed in Non-patent documents 1, 2 are shown in FIG. 19.

The replacement of the measured delay times with the delay times along the shortest paths indicates that delay times between all the landmark servers may not necessarily be measured. In other words, client a may not measure a delay time up to landmark server D, and a delay time up to landmark server C may be calculated as 209 msec. from the sum of the delay time of 56 msec. up to landmark server F and the delay time of 153 msec. from landmark server A to landmark server C, which is essentially the same value as the actual delay time of 207 msec. up to landmark server C. If only delay times between client a and some landmark servers are to be measured, then only delay times between the client and landmark servers (e.g., landmark servers that are present in the same region as the client) which are predicted to have small delay times with the client may be measured.

Operation of a client (assumed to be client b) which requests the acquisition of contents to acquire the contents from another client, using the coordinates of the client calculated by the above process will be described below. It is assumed that clients a, c have already viewed the visual contents that wear identified by contents identifier "A" and are holding the contents in data storages 534, 554. It is also assumed that data location storage 561 of data location management server 560 registers therein clients identifiers a, c and contents identifier "A" in relation to each other in response to requests from clients a, c, (see FIG. 10) and coordinate storage 564 registers therein the coordinates of clients a, c in response to requests from clients a, c, (see FIG. 11). The visual contents that wear identified by contents identifier "A" may hereinafter be referred to as visual content "A".

Figures 20, 21:
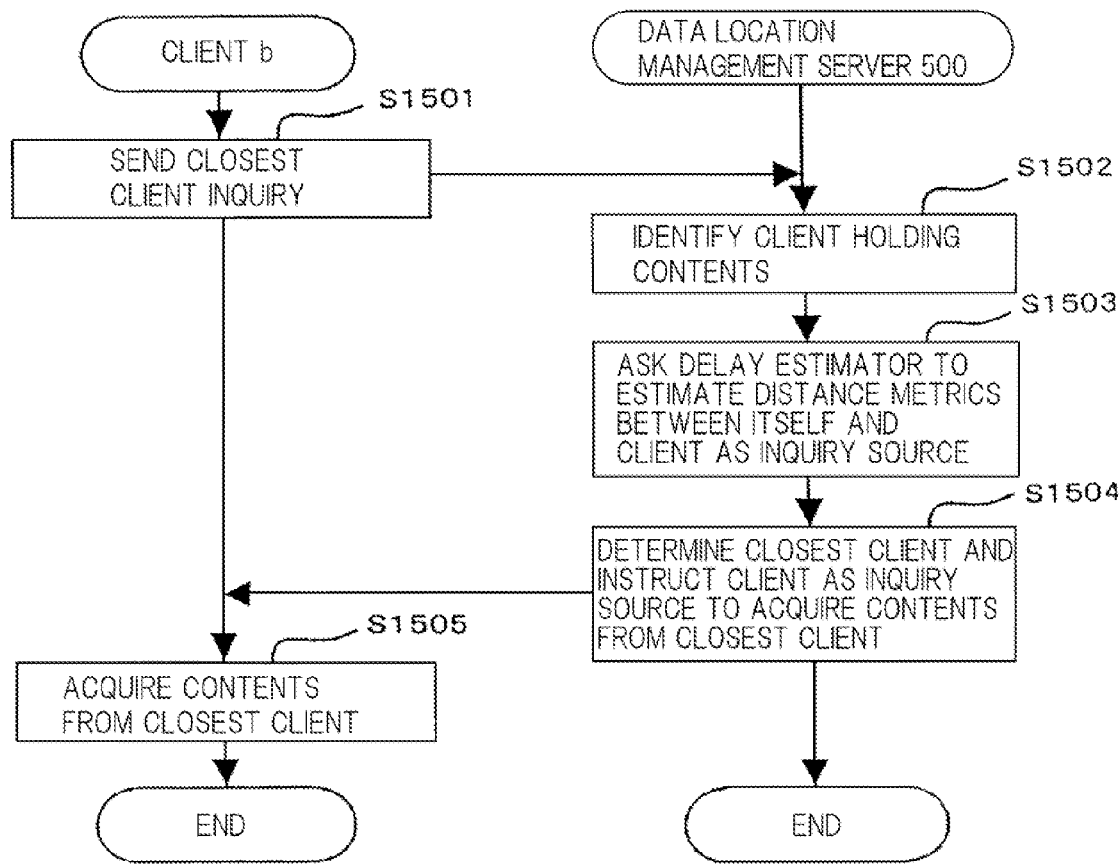
FIG. 20 is a flowchart of an example of a processing sequence mainly of a data location management server.
FIG. 21 is a diagram showing estimated results produced by a delay estimator.

When a view request for visual contents "A" occurs, data acquirer 545 of client b sends a closest client inquiry to data location management server 560 as indicated by a flowchart shown in FIG. 20 (step 1501). The closet client inquiry includes contents identifier "A" and the coordinates of client b read from coordinate storage 543.

When closest data determiner 562 of data location management server 560 receives the closet client inquiry from client b, it searches data location storage 561 for the client identifiers of clients which hold visual contents "A" (step 1502). In this example, client identifiers a, c are discovered.

Thereafter, closest data determiner 562 transfers client identifiers a, c and the coordinates of client b to delay estimator 563 to ask delay estimator 563 to estimate delay times between client b and clients a, c (step 1503). Delay estimator 563 reads the coordinates of clients a, c from coordinate storage 564, and estimates Euclidean distances (delay times) between clients a, b and between clients b, c from the coordinates of clients a, c and the coordinates of client b. FIG. 21 shows the estimated results. The delay time of 70 msec. between clients a, b is determined according to [(−176+144)2+(57−2)2+(12−40)2]½. Estimated results according to the technology disclosed in Non-patent documents 1, 2 and measured results are shown in FIGS. 22 and 23, respectively.

Thereafter, closest data determiner 562 judges that client b is closer to client a than to client c based on the estimated results produced by delay estimator 563, and instructs client b to acquire the visual contents "A" from closest client a (step 1504). Based on the instructions, data acquirer 545 of client b accesses data storage 543 of client a and acquires the contents therefrom. Since a closest node among the clients holding contents A" on the network is selected, client b can acquire the content in a short time. According to the estimated results of Non-patent documents 1, 2, as can be understood from FIG. 22, client b judges that the delay times between itself and clients a, c are the same as each other, and may acquire the contents from client c.

Figure 24:
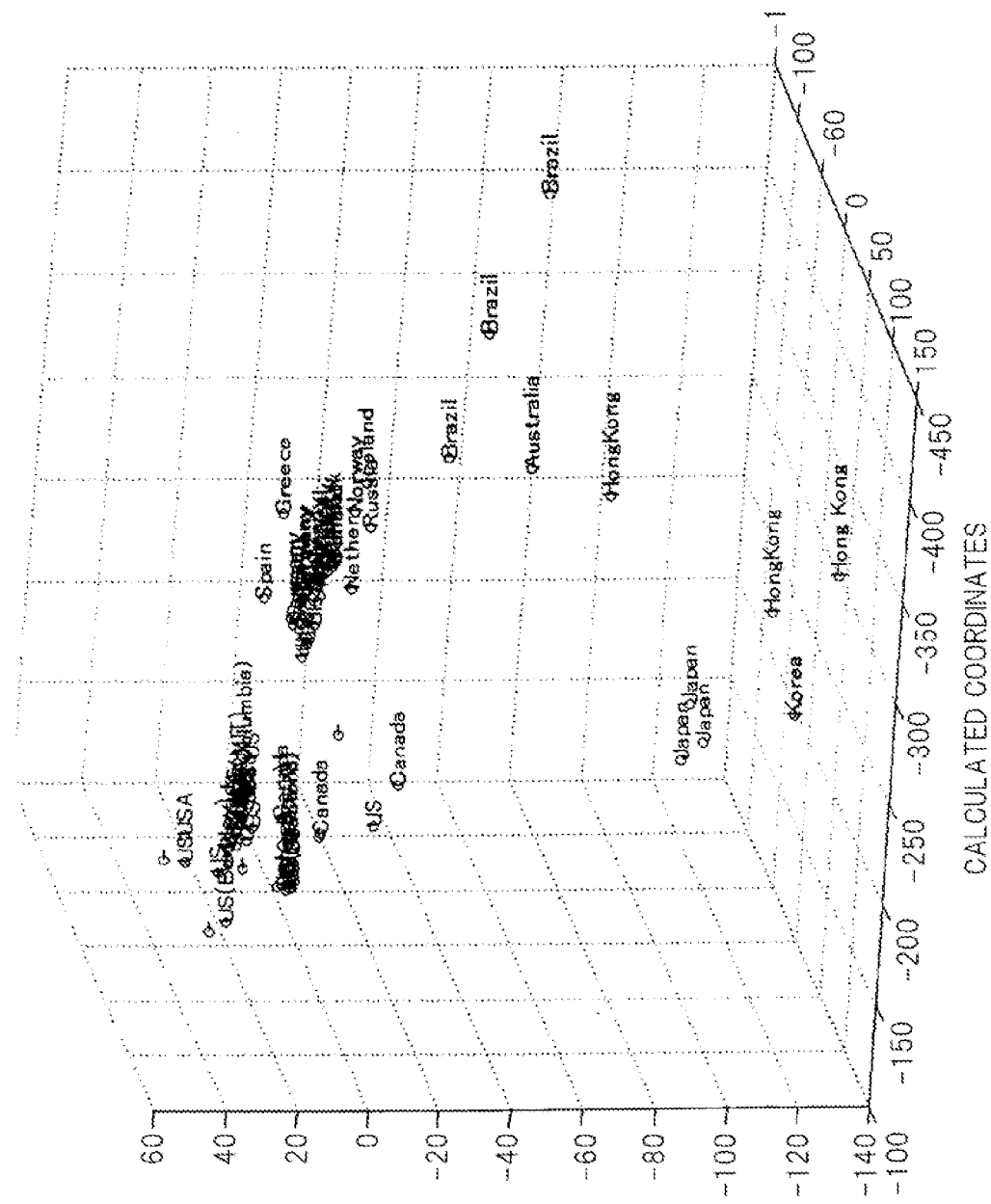
FIG. 24 is a diagram showing the coordinates of nodes of a PlanetLab system.
Figure 25:
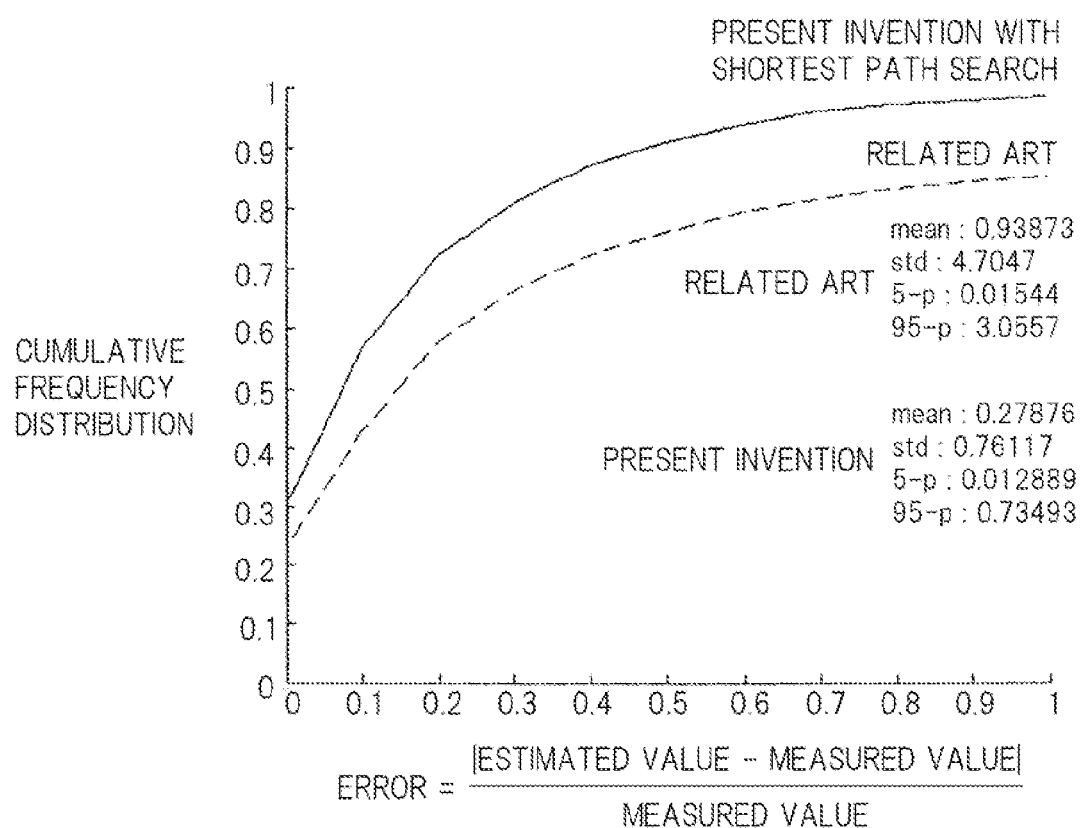
FIG. 25 is a graph showing errors between estimated values and measured values of delay times between nodes of the PlanetLab system.

The data used herein are based on the data of PlanetLab system (93 nodes) made up of the nodes of the global Internet. In the above exemplary embodiment, 3 nodes are illustrated as clients. The coordinates of the three nodes are shown in FIG. 24, and errors between estimated values of delay times between the 93 nodes calculated from those coordinates and measured values of the delay times are shown in FIG. 25. The errors according to Non-patent documents 1, 2 are indicated by the broken-line curve. It can be seen from FIG. 25 that the estimating errors are smaller according to the present invention.

In the above description, a distance metric represents a delay time. However, a distance metric may represent the cost required for communications or both the delay time and the cost required for communications. In the above description, a network represents a communication network. However, a network may represent a traffic network. If a network represents a traffic network, then a distance metric may represent the time required to move, the cost required to move, or both the time required to move and the cost required to move. In the above description, closest data determiner 562 selects a coordinate-to-be-calculated node whose delay time is the shortest. However, closest data determiner 562 may select a coordinate-to-be-calculated node which minimizes the cost required to communicate or a coordinate-to-be-calculated node which minimizes the delay time and the cost required to communicate. If a network represents a traffic network, then closest data determiner 562 may select a coordinate-to-be-calculated node which minimizes the time required to move, a coordinate-to-be-calculated node which minimizes the cost required to move, or a coordinate-to-be-calculated node which minimizes the time required to move and the cost required to move.

(Advantages of the Second Exemplary Embodiment)

According to the present exemplary embodiment, when a client is to acquire contents, it can acquire the contents from a client with the shortest delay time from the client acquiring the contents, among clients which are holding the contents, because closest data determiner 562 controls delay estimator 563 to estimate delay times between clients holding the contents and the client wishing to acquire the contents, and instructs the client to acquire the contents from the client with the shortest delay time.

Industrial Applicability

The present invention is applicable to applications for quickly acquiring data dispersed over the Internet. For example, the present invention is applicable to the acquisition of the closest data among visual and video data duplicated at a plurality of locations on the Internet in a CDN (Contents Delivery Network). The data are not limited to large-capacity data such as video data, but also include small-capacity data such as file data. The present invention can be used to speed up databases and storages that are dispersed in a wide area.

Other applications include an estimation process for estimating the time in a traffic network and a geographic search process for searching for the closest post office. If a traffic network is used as a network with relay points at stations and intersections and landmarks at well-known facilities and places, then it is possible to calculate coordinates capable of estimating times in the traffic network. Specifically, by setting times from one's own house to well-known facilities and places, it is possible to assign coordinates to the house and to estimate times from the house to any other places having other coordinates.

The present invention has been described above in reference to the exemplary embodiments. However, the present invention is not limited to the above exemplary embodiments. Rather, various changes that can be understood by those skilled in the art within the scope of the invention may be made to the arrangements and details of the present invention.

The invention claimed is:

1. A distance metric estimating system comprising:
    a distance metric storage for storing distance metrics determined between each landmark node and other landmark nodes which are present on a network;
    shortest path searching means for searching for shortest paths from each landmark node to other landmark nodes based on the distance metrics between the landmark nodes which are stored in said distance metric storage, and calculating first distance metrics along the discovered shortest paths;
    coordinate axis generating means for generating coordinate axes of a predetermined dimension number from the first distance metrics along the shortest paths which are calculated by said shortest path searching means;
    coordinate calculating means for calculating coordinates of a coordinate-to-be-calculated node from distance metrics between said coordinate-to-be-calculated node and the landmark nodes which are present on the network and the coordinate axes generated by said coordinate axis generating means; and
    distance metric estimating means for estimating a distance metric between two coordinate-to-be-calculated nodes whose coordinates are calculated by said coordinate calculating means, using the calculated coordinates,
    wherein
    said shortest path searching means searches for shortest paths from said coordinate-to-be-calculated node to said landmark nodes, using the distance metrics between said coordinate-to-be-calculated node and the landmark nodes which are present on the network and the distance metrics between said landmark nodes stored in said distance metric storage, and calculates second distance metrics along the discovered shortest paths; and
    said coordinate calculating means uses the second distance metrics along the discovered shortest paths calculated by said shortest path searching means, instead of the distance metrics between said coordinate-to-be-calculated node and the landmark nodes which are present on the network.

2. The distance metric estimating system according to claim 1, wherein said coordinate axis generating means performs a dimensional compression process in generating said coordinate axes.

3. The distance metric estimating system according to claim 1, wherein said distance metric estimating means estimates distance metrics between coordinate-to-be-calculated nodes which satisfy a prescribed condition and a particular coordinate-to-be-calculated node, further comprising:
    closest data determining means for selecting a coordinate-to-be-calculated node having a smallest distance metric up to said particular coordinate-to-be-calculated node, among the coordinate-to-be-calculated nodes which satisfy said prescribed condition, based on the estimated distance metrics.

4. The distance metric estimating system according to claim 3, further comprising:
    a data location storage for storing contents identifiers of contents and node identifiers of coordinate-to-be-calculated nodes which are holding the contents, in relation to each other; and
    a coordinate storage for storing the coordinates of the coordinate-to-be-calculated nodes whose node identifiers are stored in said data location storage, which coordinates are calculated by said coordinate calculating means, in relation to the node identifiers of said coordinate-to-be-calculated nodes;
    wherein
    said network comprises a communication network;
    said distance metrics comprise delay times;
    said coordinate-to-be-calculated nodes which satisfy said prescribed condition comprise coordinate-to-be-calculated nodes which are holding particular content;
    when said closest data determining means is given the coordinates of said particular coordinate-to-be-calculated node and a contents identifier, said closest data determining means transfers the node identifiers of coordinate-to-be-calculated nodes which are holding the contents of said contents identifier discovered from said data location storage and the coordinates of said particular coordinate-to-be-calculated node, to said distance metric estimating means to enable said distance metric estimating means to estimate delay times between the coordinate-to-be-calculated nodes which are holding the contents and said particular coordinate-to-be-calculated node, and selects one of the coordinate-to-be-calculated nodes which are holding the contents, with the delay time between itself and said particular coordinate-to-be-calculated node being shortest, based on the delay times estimated by said distance metric estimating means between the coordinate-to-be-calculated nodes which are holding the contents and said particular coordinate-to-be-calculated node; and said distance metric estimating means searches said coordinate storage for coordinates which are stored in relation to the node identifiers transferred from said closest data determining means, and estimates delay times between the coordinate-to-be-calculated nodes which are holding the contents of said contents identifier, from the discovered coordinates and the coordinates of said particular coordinate-to-be-calculated node.

5. The distance metric estimating system according to claim 1, wherein
said network comprises a communication network; and
said distance metrics comprise delay times.

6. The distance metric estimating system according to claim 1, wherein
said network comprises a communication network; and
said distance metrics comprise costs required to transfer data.

7. The distance metric estimating system according to claim 1, wherein
said network comprises a traffic network; and
said distance metrics comprise times required to move.

8. The distance metric estimating system according to claim 1, wherein
said network comprises a traffic network; and
said distance metrics comprise costs required to move.

9. A coordinate calculating node comprising:
a distance metric storage for storing distance metrics determined between each landmark node and other landmark nodes which are present on a network;
a shortest path searching means for searching for shortest paths from each landmark node to other landmark nodes based on the distance metrics between the landmark nodes which are stored in said distance metric storage, and calculating first distance metrics along the discovered shortest paths;
coordinate axis generating means for generating coordinate axes of a predetermined dimension number from the first distance metrics along the shortest paths which are calculated by said shortest path searching means; and
coordinate calculating means for calculating coordinates of a coordinate-to-be-calculated node from distance metrics between said coordinate-to-be-calculated node and the landmark nodes which are present on the network and the coordinate axes generated by said coordinate axis generating means, wherein
said shortest path searching means searches for shortest paths from said coordinate-to-be-calculated node to said landmark nodes, using the distance metrics between said coordinate-to-be-calculated node and the landmark nodes which are present on the network and the distance metrics between said landmark nodes stored in said distance metric storage, and calculates second distance metrics along the discovered shortest paths; and
said coordinate calculating means uses the second distance metrics along the discovered shortest paths calculated by said shortest path searching means, instead of the distance metrics between said coordinate-to-be-calculated node and the landmark nodes which are present on the network.

10. The coordinate calculating node according to claim 9, wherein said coordinate axis generating means performs a dimensional compression process in generating said coordinate axes.

11. A distance metric estimating method, which provides a distance metric storage for storing distance metrics determined between each landmark node and other landmark nodes which are present on a network, comprising:
a first step in which shortest path searching means searches for shortest paths from each landmark node to other landmark nodes based on the distance metrics between the landmark nodes which are stored in said distance metric storage, and calculates first distance metrics along the discovered shortest paths;
a second step in which coordinate axis generating means generates coordinate axes of a predetermined dimension number from the first distance metrics along the shortest paths which are calculated in said first step;
a third step in which coordinate calculating means calculates coordinates of a coordinate-to-be-calculated node from distance metrics between said coordinate-to-be-calculated node and the landmark nodes which are present on the network and the coordinate axes generated in said second step; and
a fourth step in which distance metric estimating means estimates a distance metric between two coordinate-to-be-calculated nodes whose coordinates are calculated in said third step, using the calculated coordinates, wherein
said first step searches for shortest paths from said coordinate-to-be-calculated node to said landmark nodes, using the distance metrics between said coordinate-to-be-calculated node and the landmark nodes which are present on the network and the distance metrics between said landmark nodes stored in said distance metric storage, and calculates second distance metrics along the discovered shortest paths; and
said third step uses the second distance metrics along the discovered shortest paths calculated in said first step, instead of the distance metrics between said coordinate-to-becalculated node and the landmark nodes which are present on the network.

12. The distance metric estimating method according to claim 11, wherein said second step performs a dimensional compression process in generating said coordinate axes.

13. A non-transitory computer readable medium storing a program for enabling a computer including a distance metric storage that stores distance metrics determined between each landmark node and other landmark nodes which are present on a network, to function as a coordinate calculating node, said program enabling said computer to function as:
shortest path searching means for searching for shortest paths from each landmark node to other landmark nodes based on the distance metrics between the landmark nodes which are stored in said distance metric storage, and for calculating first distance metrics along the discovered shortest paths;
coordinate axis generating means for generating coordinate axes of a predetermined dimension number from the first distance metrics along the shortest paths which are calculated by said shortest path searching means;
coordinate calculating means for calculating coordinates of a coordinate-to-be-calculated node from distance metrics between said coordinate-to-be-calculated node and the landmark nodes which are present on the network and the coordinate axes generated by said coordinate axis generating means; and distance metric estimating means for estimating a distance metric between two coordinate-to-be-calculated nodes whose coordinates are calculated by said coordinate calculating means, using the calculated coordinates, wherein said shortest path searching means searches for shortest paths from said coordinate-to-be-calculated node to said landmark nodes, using the distance metrics between said coordinate-to-be-calculated node and the landmark nodes which are present on the network and the distance metrics between said landmark nodes stored in said distance metric storage, and calculates second distance metrics along the discovered shortest paths; and said coordinate calculating means uses the second distance metrics along the discovered shortest paths calculated by said shortest path searching means, instead of the distance metrics between said coordinate-to-be-calculated node and the landmark nodes which are present on the network.

14. The non-transitory computer readable medium storing a program according to claim 13, wherein said coordinate axis generating means performs a dimensional compression process in generating said coordinate axes.

* * * * *